United States Patent
Smith (12)

(10) Patent No.: US 6,357,183 B1
(45) Date of Patent: *Mar. 19, 2002

(54) WATER CONSERVATION METHOD AND APPARATUS THEREFOR

(76) Inventor: Frank Smith, 19 Gorman St., Willoughby New South Wales (AU), 2068

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,161

(22) PCT Filed: Oct. 17, 1995

(86) PCT No.: PCT/AU95/00693

§ 371 Date: Apr. 16, 1997

§ 102(e) Date: Apr. 16, 1997

(87) PCT Pub. No.: WO96/12070

PCT Pub. Date: Apr. 25, 1996

(30) Foreign Application Priority Data

Oct. 17, 1994 (AU) ............................................. PM 8841
Jun. 2, 1995 (AU) ............................................. PN 3341

(51) Int. Cl.⁷ ............................................. E04D 13/064
(52) U.S. Cl. ..................... 52/15; 52/11; 52/16; 52/58; 52/302.6; 137/360; 137/861; 239/208; 239/194
(58) Field of Search .............................. 52/11, 12, 15, 52/16, 57, 58, 302.1, 302.6, 169.7; 137/357, 360, 861; 239/208, 193, 194

(56) References Cited

U.S. PATENT DOCUMENTS 5,730,179 A  *  3/1998  Taylor ........................... 137/357
5,931,118 A  *  8/1999  Thompson .................... 119/69.5
6,076,307 A  *  6/2000  Kean ................................ 62/11

FOREIGN PATENT DOCUMENTS

AU   53008   *  1/1994
DE   3419529   *  11/1985
DE   3825310   *  2/1990

OTHER PUBLICATIONS

Abstracts to: AU 53008/94, AU 88320/91, DE 3419529 and DE 4227020.*

* cited by examiner

Primary Examiner—Carl D. Friedman
Assistant Examiner—Yvonne M. Horton
(74) Attorney, Agent, or Firm—Jonathan E. Grant; Grant Patent Services (57) ABSTRACT

The invention relates a water storage and storm water collection and detention system including at least one storage reservoir integrally attached to and extending along the edge of an extremity of a roof of a building structure; wherein the storage reservoir directly receives run-off from the roof. The system further includes at least one outlet, a supply line in communication with the outlet, an overflow outlet, and a float valve assembly connected to the supply line such that the reservoir communicates with a mechanism that allows for the water collected therein to be used with a water consumption apparatus or tap line on demand.

13 Claims, 9 Drawing Sheets

WATER CONSERVATION METHOD AND APPARATUS THEREFOR

The present invention relates to water reticulation but more particularly relates to a method and apparatus for water storage, conservation and delivery whereby the apparatus is incorporated in the structure of a building.

Australia one of the driest continents in the world as a result of which, as demand for water increases, this causes the price of water to be forced upwards and places increased pressure on a very limited resource. Lack of rainfall and increasing water consumption is also a problem in many other countries necessitating more efficient use of water resources and water conservation.

To address this problem authorities have in the past imposed certain restrictions on water use and this usually results in cost imposts on excess water use. Also, with increased urbanisation, there is an increasing load on storm water infrastructure causing water and drainage authorities to implement policies which make individuals responsible for roof run-off from individual properties. Thus, water consumers are now required to consider the implications that excess water usage and production of run-off by building structures has for water supply and drainage infrastructure.

If rain water can be properly conserved and for some uses, such as but not limited to, flushing toilets supplemented with town water there would be reduced urgency to increase town water supply capacity such as, by construction of new dams.

Up to 30% of water use in the domestic environment is dedicated to flushing the toilet. Each time a toilet is flushed 6–13 litres is used. When this is extrapolated over the wider community it represents a large proportion of the water supply which is largely wasted. In a city with a population of around 4 million around 100,000 megalitres of town water is flushed through the sewerage system per year. One quarter of cities water supply therefore could conceivably be dedicated to flushing toilets.

Much of the water used in flushing toilets, washing, watering the garden, etc. need not be of potable quality. Water for these activities can therefore be obtained from a source other than from town water. Presently, particularly in rural areas, water tanks are used to collect roof run-off. This is largely necessitated by the absence of a ready supply of town water. Usually the tanks are external to a dwelling or other building and are connected to roof guttering by means of a downpipe. The water is either pumped or it simply gravitates to the discharge taps. In urban areas, as there is usually town water available for water consuming appliances, tanks are not generally used. However, with the increasing need for water conservation and more efficient use of available water resources it has now been recognised that house and building design should be modified to accommodate on or within a building, large water storage capacity supplied by storm water run-off so that this can be used to reduce demand for town water and provide for retardation of a stormwater run-off thereby reducing overland run-off and hence the load of drainage infra-structure.

In one form of the apparatus aspect, the present invention comprises;

an apparatus for the collection, storing and delivery of storm water and which is incorporated into a building structure, the apparatus comprising:
a storage reservoir attached to said structure,
means to enable egress of storm water from a catchment provided in or on the structure into the reservoir,
an outlet to the reservoir in communication with a supply line which terminates at a tap or water consuming appliance, characterised in that the reservoir also includes a supplementary supply of water from an alternative source such as a mains supply.

Preferably, the reservoir is disposed longitudinally along the wall of a building and includes overflow spigots.

In order to ameliorate the problems of increased town water demand the present invention according to the method aspect provides a method of water conservation, storage and delivery to an appliance, utilising storm water held in a storage reservoir which includes a supplementary mains supply wherein the reservoir is incorporated into a building structure. As a result of the aforesaid, the invention also provides a detention reservoir for holding storm water for gradual release to water consuming appliances on demand and where demand is low, overflow into drainage infra structure.

In one form, according to an apparatus aspect, the invention comprises; an apparatus integrally incorporated into a building and which conserves water usage by providing a storage reservoir and an inlet to the reservoir to allow ingress of storm water from a catchment incorporated on the building.

According to a preferred embodiment the reservoir comprises two inlets, one delivering town water and another delivering storm water to the reservoir from the catchment and at least two outlets, one providing an overflow to an associated storm water network and the other providing communication between the reservoir and a tap or water consuming appliance.

According to one broad form of the method aspect the present invention comprises; a method for the collection and storage of storm water discharge from a building for delivery to a valve or to a water consuming appliance within the building, comprising the steps of:

a) installing at least one water storage reservoir at a preselected location in the building so that the reservoirs are attached to or integral with the building;

b) providing an opening to each said reservoirs which is in communication with a storm water catchment on the building to convey storm water to said reservoir;

c) providing an inlet in communication with a second source of water from a remote location which discharges into the reservoir/s to supplement storm water stored in the reservoir/s;

d) providing on at least one reservoir an outlet which communicates with an appliance which consumes water or a tap remote from the reservoir/s which discharges water;

e) providing a float switch in or on the reservoir which allows the second source of water to supplement water stored in the reservoir from said catchment; and f) providing an overflow in the reservoir for discharge water when the water in the reservoir reaches a predetermined level.

In the preferred form, the stored water travels to the appliance from the reservoir under the assistance of gravity. Alternatively, where the appliance is higher than the outlet of the reservoir a feed pump is installed between the outlet and the appliance. Steps b) to f) can be performed in any order. Preferably, the second source of water is town water and augments the level of storm water in the reservoir.

According to a preferred embodiment, the reservoir includes an outlet located either above or below the level of the appliance inlet such that when the reservoir is above the appliance inlet, feeding to the appliance takes place under gravity and when the tank is below the appliance inlet, the feeding takes place via a pump downstream of the outlet of the reservoir but upstream of the inlet to the appliance.

According to an alternative form the invention comprises an apparatus for the collection, storage and delivery of water obtained from a source such as storm water wherein the apparatus comprises a reservoir for the storage of water, means thereon or therein to regulate the flow of water to and/or from the reservoir; characterised in that the reservoir is located at or near the roof level of a dwelling and runs in a direction generally parallel with the wall of a structure to which the apparatus is attached. Preferably, the apparatus comprises an elongated generally rectangular storage tank which runs longitudinally relative to the wall of a structure and is preferably disposed under and supported at the eaves location of a building such that the reservoir is concealed by means of a preselected decorative cladding material. Alternatively, the reservoir is concealed: On the front face by means of a preselected fascia material. On the bottom face by a preselected eaves lining material; on the back face by the walling of the building. Alternatively, the front and bottom of the tank may be used as the fascia and eave of the building. Preferably, the water retention and storage apparatus also comprises a series of overflow spigots which enable overflow water from the reservoir when the water has reached the limit of the reservoir's capacity.

According to another broadest form of the apparatus aspect, the present invention comprises;

a storm water storage and retention apparatus comprising a storage tank disposed at or near the roof line of a structure, a spigot system which provides a series of overflow openings through which excess storm water flows wherein the total cross sectional area of the spigots is such that the collective area of the spigot openings will be sufficient to accommodate a design flood for a given geographical location.

In the broadest form of the apparatus aspect the present invention comprises;

a water storage and storm water collection apparatus for incorporation in or on a building structure such that the apparatus is integral with the building structure and generally forms part of the structure; the apparatus comprising;

at least one storage reservoir;

a catchment provided on the building in communication with the storage reservoir/s so that storm water run-off from the catchment enters the reservoir/s;

at least one outlet from the reservoir/s in communication with a supply line which terminates at a tap or water consuming appliance, means on the reservoir/s which communicates with a supply line allowing ingress of a supplementary water supply from an alternative source such as a mains supply.

The present invention will now be described in more detail according to a preferred but non limiting embodiment and with reference to the accompanying illustrations wherein.

The present invention provides a method for storing water and an associated apparatus for incorporation in or on a building structure wherein the apparatus includes a reservoir which receives run-off from a catchment area such as a roof of the building to enable use of storm water and to supplement and reduce demand for town water. The apparatus also reduces storm water discharge from buildings as the storm water is stored in or on the building in the reservoir and is only discharged into the ground around a building thence into the storm water drainage infra structure when the reservoir is fill. When this occurs in all buildings in a preselected urban area, the reduction in town water demand and storm water discharge is dramatic.

The present invention will be described according to various embodiments and it will be appreciated that there are many ways in which the reservoir can be concealed within or incorporated into the building structure. The reservoir may comprise a series of smaller interconnected reservoirs which are disposed around the wall of a building. Thus throughout the description a reference to reservoir can also be taken as a reference to a series of interconnected reservoirs. The embodiments to be described show the reservoir concealed about the eaves line of a dwelling such that the reservoir is concealed by fascia or indeed itself forms the eaves and fascia.

Figure 1:
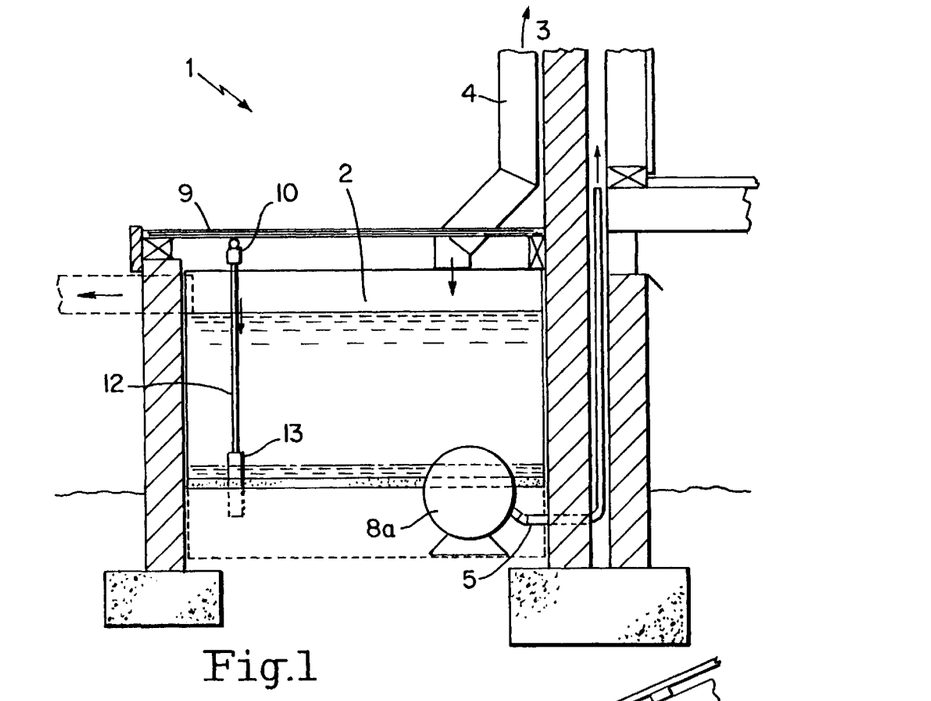
FIG. 1: shows a schematic elevational view of a water collection and storage apparatus including a pump fed to an appliance according to one embodiment of the invention.

Referring to FIG. 1 there is shown a schematic layout of an apparatus 1 for collecting and storing storm water according to one embodiment of the invention wherein a storage reservoir is built into the structure and which receives run-off from the roof of the building. The apparatus comprises a storage reservoir 2 for storing storm water collected from a catchment provided by a roof located (in the direction of arrow 3) via an inlet pipe 4. Reservoir 2 includes an feedline 5 which communicates with an inlet pipe 4 which in turn communicates with a water consuming appliance (not shown). Thus the appliance is fed by pumping of the water in reservoir 2. The reservoir 2 is further characterised in having an additional control assembly 9 which is linked to a mains pressure supply line 10 which supplements the water supply to reservoir 2. Located in the reservoir is a float valve 12 which includes a float switch 13. When the level of the water in the reservoir falls below a predetermined minimum, float valve 12 is actuated causing mains water to enter and refill the reservoir. Normally, the reservoir is replenished by the storm water which is collected from catchment 3 which may be the roof 14 of a structure 15 (see FIG. 2). According to conventional methodology, an appliance such as a toilet cistern which is a heavy water consumer is operated by main supply water. Toilet water use constitutes around 25% of domestic water usage and a high percentage of commercial and industrial usage. In fact, the average household with 3 people could conceivably consume about 200–230 litres per day just through toilet use. According to the assembly in periods of average to above average rainfall it could be expected that no mains water would be necessary to supplement storm water use provided the reservoir size is accurately sized according to local rainfall conditions. The reservoirs may be formed from tanks of a variety of material including steel, copper, fibreglass, concrete, aluminum or plastics, fibreglass, glass and reinforced concrete.

According to this embodiment the reservoir is suited for installation at ground level and particularly on sites where it is not possible for the reservoir to be placed above the water consuming appliance.

Where the appliance is above the outlet it is necessary for a pump 8a to be inserted in feed line 5 in order to pump water stored in the reservoir to the appliance.

When water is demanded by an appliance, pump 8a sensing the reduction in pressure in feed line 5 is actuated by a pressure switch thereby continuing delivery of water to the appliance. As this occurs, the water level in the reservoir drops. Normally, the reservoir relies for its replenishment on storm water run-off from the catchment located in the direction of arrow 3. If the water level in the reservoir drops below a predetermined level the water is supplemented by actuation of float switch 13. When the water reaches the predetermined minimum level, the float valve 12 allows flow of water from the main supply line 10 into the reservoir to supplement the water supply. In this way an appliance may use storm water most of the time thereby conserving mains supply water.

Figure 2:
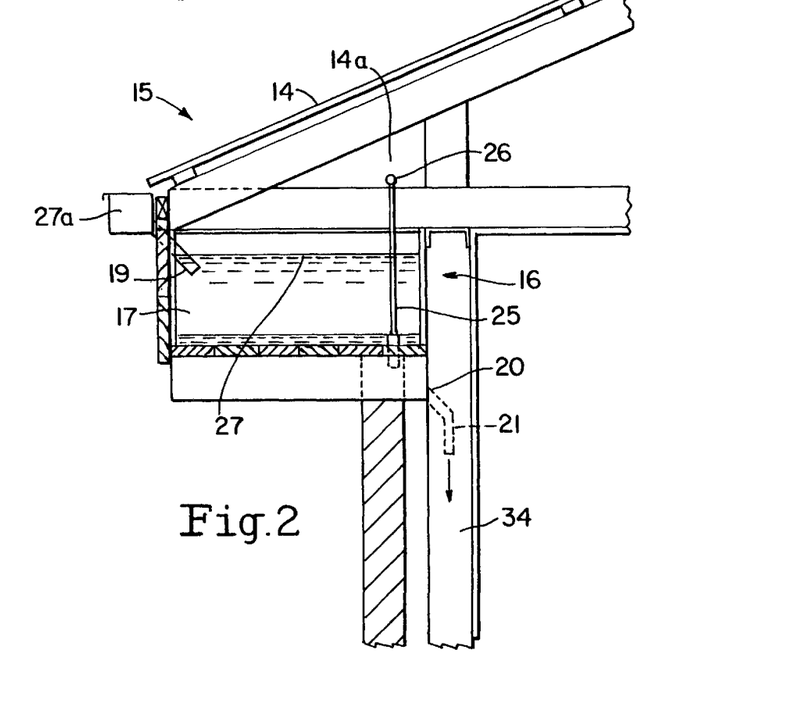
FIG. 2: shows a schematic elevational view of a water collection and storage apparatus according to an alternative embodiment, wherein the appliance is gravity fed.

Referring to FIG. 2 there is shown an apparatus according to an alternative embodiment of the invention retrofitted to an existing building. According to this embodiment there is provided an apparatus 16 comprising a reservoir 17 for collecting and storing storm water from roof 14. The reservoir includes an inlet 19 comprising an opening which is in communication with roof 14 and which feeds reservoir 17. Inlet 19 may comprise an opening in the top of reservoir such that the reservoir forms and open channel. Reservoir 17 also includes an outlet 20 which feeds appliance 7 (see FIG. 4) via feed line 21. This feed line may run externally of or within the walls of the building. Reservoir 17 also includes a float valve assembly 25 which is connected to mains water supply line 26. In normal use, water from roof 14 fills the reservoir with storm water. When water is demanded by an appliance, reservoir 17 begins to empty via line 21. When the water reaches its predetermined minimum level, float valve assembly 25 activates to allow town water to enter the tank supplementing available storm water. Only where rainfall is low will the reservoir water reach a level which will cause usage of mains supply. In order to minimise this possibility the storage reservoir is sized according to the prevailing rainfall conditions. Thus in regions of high rainfall the reservoir need only be relatively small, in order to reduce demand for mains water, (but would need to be larger if reduction of storm water overflow was necessary in a particular geographic location) whereas in regions of very low rainfall the tank would need to be large if usage of mains water was to be kept to a minimum. Where there is an excess of storm water this is released via an overflow pipe. Reservoir 17 of FIG. 2 includes overflow pipe 27. Unlike the arrangement of FIG. 1 where the water is pumped from reservoir 2 reservoir 17 delivers its water to an appliance by gravity feed.

Figure 3:
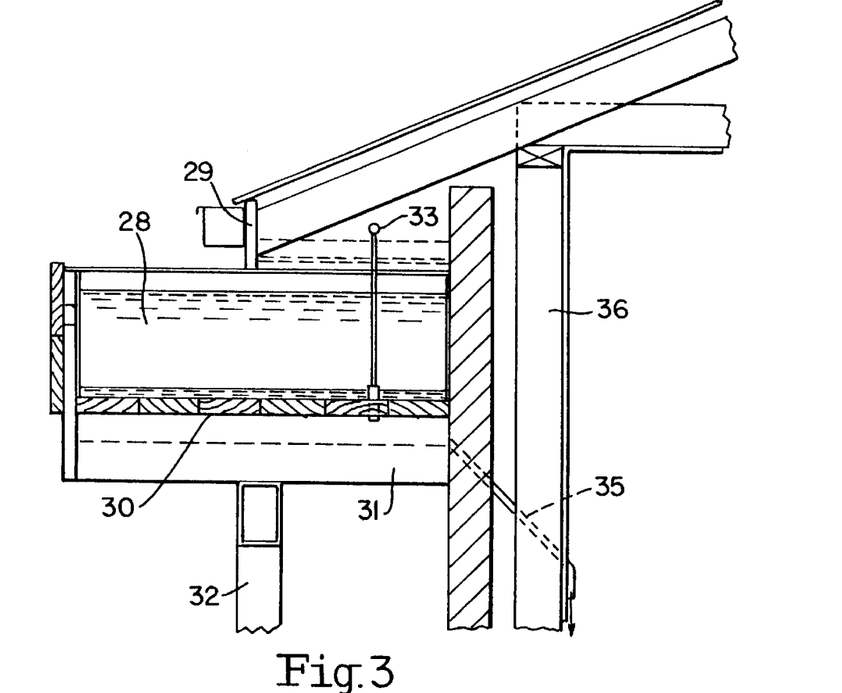
FIG. 3: shows an alternative embodiment of the arrangement of FIG. 2.

FIG. 3 shows an alternative embodiment of the apparatus of the present invention retrofitted to an existing building. The embodiment shown is similar to that described for FIG. 2 however, according to the present embodiment the assembly includes an enlarged reservoir 28 which would be desirable in regions having low rain fall due to its large storage capacity. The arrangements of FIGS. 2 and 3 show reservoirs which are connected under the eaves line of a dwelling. It is conceivable that the reservoirs can be dimensioned so as to fit behind a fascia panel or alternatively, as shown in FIG. 3 reservoir 28 can extend well beyond fascia 29 thereby increasing catchment capacity. Aesthetic consideration as well as supply and storage criteria may dictate the tank proportions and configuration.

As the tank size increases, the weight increases necessitating structural arrangements for ensuring adequate support in the tank fill condition.

FIG. 3 shows one possible structural arrangement whereby reservoir 28 is located on structural planks 30 which overlie a steel support frame 31 which is in turn supported on pedestal 32.

In each of the tank arrangements shown in FIGS. 2 and 3, the mains supply lines 26 and 33 respectively are introduced to the reservoirs via the roof cavity. If FIG. 2 the mains supply line 26 is introduced via roof cavity 14a. Roof gutter 27a may remain or may be removed thus allowing roof water to gravitate directly into reservoir 17.

It will be appreciated that the main supply line can be introduced into the reservoir at any convenient location which will accommodate the float switch. The supply line to an appliance can be routed either inside an internal wall or inside the cavity of the building. In FIG. 2 supply line 21 is routed inside wall 34 which may comprise a stud frame of timber or metal for instance whereas in FIG. 3 supply line 35 is surface mounted on inner wall 36.

Figure 4:
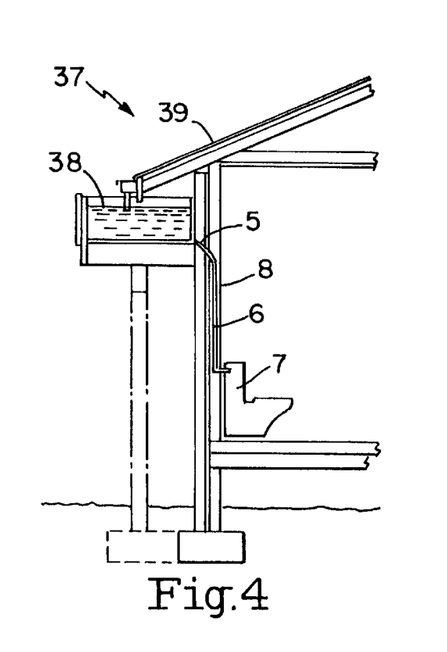
FIG. 4: shows the schematic arrangement of FIG. 3 with an enlarged reservoir.

FIG. 4 shows a side elevational view of part of a structure 37 which includes a toilet cistern 7. From FIG. 4 the relative separation between the reservoir 38 and cistern 7 can be seen. Reservoir 38 collects storm water from roof 39 and may be configured so it spans the full length of a wall in order to maximise catchment volume for a given structure and geographic region.

Figure 5:
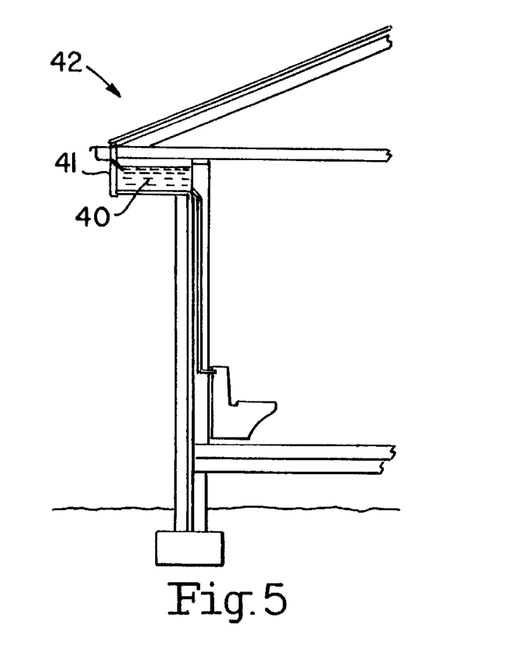
FIG. 5: shows a schematic view of an apparatus including the water consuming appliance.

FIG. 5 shows an arrangement similar to that shown in FIG. 4 wherein the reservoir 40 has been reduced so that its edge 41 fits comfortably along fascia line 41 of building structure 42. Alternatively, the outer face of reservoir 40 may itself form the fascia.

Figure 6:
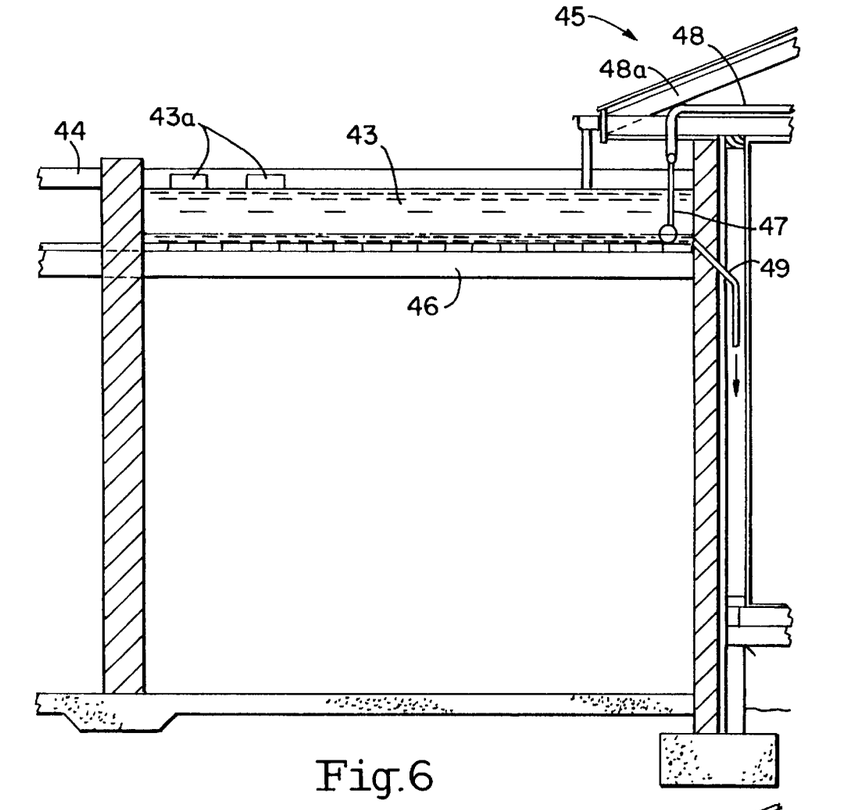
FIG. 6: shows an assembly according to an alternative embodiment of the invention wherein the reservoir is located on the roof of a structure adjacent the structure including the water consuming appliance.

Referring now to FIG. 6 there is shown an alternative embodiment of a water conservation apparatus. According to this embodiment the assembly comprises a reservoir 43 which is located on and supported by a structure 44 which may be a car port, garage or like structure connected to or integral with adjacent structure 45. Reservoir 43 is configured so that its load is evenly distributed over the roof area of the structure 44 to maximise storage capacity. Where this arrangement is used it is necessary to reinforce the structure by means of suitably proportioned purlins 46 designed according to the load induced by the tank self weight and hydraulic weight at maximum capacity. Tank 43 includes a float switch assembly 47 connected to mains supply line 48 introduced into the reservoir via roof cavity 45a. Connected to reservoir 43 is supply line 49 which feeds an appliance (not shown) within building 45. Reservoir 43 is also adapted with an overflow pipe or opening 43a positioned so that any excess water from the reservoir may be introduced into the normal overland drainage system for the building structure 45.

Reservoirs introduced as an integral part of a building as described above to catch storm water reduces dependence on town water and with the added advantage that they act as detention reservoirs for storm water run-off which is a requirement in many local government areas. Thus, reservoirs installed in the manner previously described provide the two fold benefit of town water conservation and storm water detention and enables the town water supply to be augmented by storm water collected from the building.

The level of storm water detention in a given area and in a particular structure is commensurate with the size of the chosen reservoir and on whether the reservoir is full or empty according to the level of use of stored run-off by an appliance during a given period of precipitation.

A typically sized reservoir would empty in 25 days of average toilet use and divert about 50% of the rain falling on a suburban roof to the sewerage system and 50% to the storm water system. By utilising further rain water for garden, car washing, cold water to shower, bath basin and laundry, etc. the volume of water overflowing could be reduced by an additional 20% or more in an average year. In some geographic regions overflow could be reduced to nil.

Reservoirs can be located in the roof space of a structure suspended from the roof or alternatively, located underground beside the structure or under a verandah for instance.

Where the reservoir is located below the appliance, water pumping will be required with the pump selected being dictated by the head requirements. Reservoirs may be constructed of concrete, aerated concrete, aluminum, galvanised sheet steel or galvanised corrugated iron, fibre glass, plastics, glassed reinforced concrete, copper or rendered brick work.

According to a typical construction sequence, the wall framing of the dwelling or structure would first be completed followed by erection of the roof trusses. The reservoir would then be installed. The reservoir would be bolted, riveted or otherwise connected to the trusses and/or building structure after which fascia may be fitted followed by eaves. During this process the plumbing would be completed. Alternatively, the reservoir wall and floor would present as fascia and eaves.

As an alternative, the system may incorporate a very large storage reservoir having a series of subsidiary smaller tanks which constitute the feeder tanks for the appliances. In circumstances where rain fall is high, the subsidiary tanks may overflow and be pumped back to the larger holding tank for later use in the subsidiary tanks in the event that rain fall is low.

Figure 7:
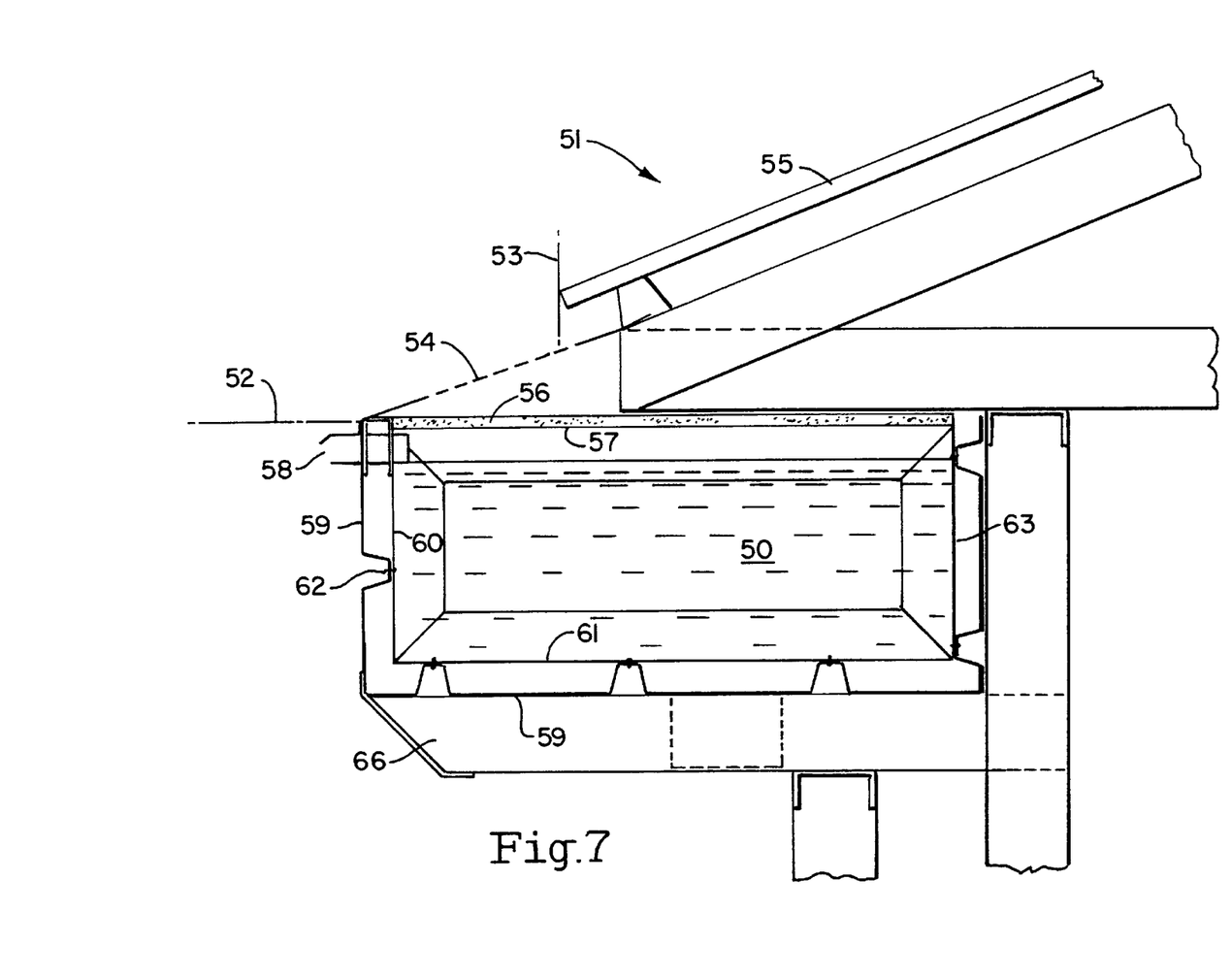
FIG. 7: shows a cross sectional view of a storm water collection and storage apparatus according to an alternative embodiment of the invention.

FIG. 7 shows an alternative embodiment of the invention this time comprising a water storage and storm water control apparatus comprising a storage reservoir 50 adapted for connection to a building 51 only part of which is shown. According to the embodiment shown in FIG. 7 the assembly is disposed at or near the truss bottom chord line 52 of building 51 supported on gutterjoist 66. Reservoir 50 is proportioned according to the available storm water in a selected geographic location and will generally run longitudinally along the wall of the building 51 at a design length and volume dictated by the required storage capacity for the selected geographical area generally the full length of the building. According to the preferred embodiment, reservoir 50 may extend beyond the extremity of the roof line 53 so as to provide a catchment access 54 from storm water collected on roof 55. Collection access 54 may comprise pressed steel leaf guard adapted with holes which on one hand allow ingress of storm water run off from roof 55 but on the other hand prevent egress into reservoir 50 of debris and other material which may be collected on roof 55 or which may simply blow towards the collection orifice 54.

According to the embodiment shown, water entering reservoir 50 may be filtered by means of a filtration pad which could be a low density polystyrene foam layer 56 disposed along the top surface of supporting frame 57 of reservoir 50. Reservoir 50 is also adapted at predetermined intervals along its length with overflow spigot assemblies 58 which allow overflow of storm water once the reservoir has reached its limit of capacity and in times of minimum demand for water but plentiful supply.

The overflow spigot assemblies 58 provide a substitute for prior art down pipes, and storm water drains and allow the overflow to pass overland or overland into drainage infrastructure such as ponds.

The cross sectional area of the overflow spigots are proportioned to accommodate a given flood for a selected geographic region and are a function of the size of the reservoir chosen. Typically, the design would accommodate the once in one hundred year flood. The total cross sectional area of the spigots will vary from location to location but as an example the total cross sectional area of the spigots could be designed to accommodate the once in one hundred year flood or alternatively precipitation of 270 mm per hour for Sydney for instance.

The total spigot area is also a function of the catchment area of the roof which supplies storm water to reservoir 50. Thus, as an example, for each square metre of roof an optimum spigot area would be for Sydney 95 mm$^2$ plus an allowance in the event that the spigot becomes blocked or partially blocked.

In most regions the collective opening spigot area would fall within the range of 40 mm$^2$–200 mm$^2$.

As a further example, a roof area of 155 sq metres may require a total spigot area of 14725 mm$^2$ plus an allowance, say 16000 mm$^2$ in total. If, for instance, 16 spigots are used the cross sectional area of each spigot is 1000 mm$^2$ or 45 mm by 25 mm in mension. The spigots may alternatively be 50 mm wide by 20 mm deep however, these mensions may be varied according to site requirements.

To minimise water jetting, the spigot outlets disposed along the length of the storage tank should be configured so as to create a spray effect rather than a water jet effect. To achieve this the total required cross sectional area for the spigot system may be effected by introducing a plurality of perforations similar to that found in a shower rose wherein the perforations would total the required cross sectional area for the spigot assembly required for a particular design condition. Alternatively, larger openings may be introduced into the wall of the reservoir.

Thus, as an example the spigot may be much be much wider than it is deep in order to create the spray effect. It has been found from hydrographic analysis that overland flow from a new building incorporating the storage and storm water control system having the spigot assembly will be less than before the building was constructed because of the storage of available rain water in the storage tanks connected to the building and the consumption of water within the building. This is particularly beneficial in flood prone areas as a significant proportion of the precipitation which would otherwise result in flood waters will be collected for storage and consumption. As a result of the system when incorporated in a building structure, overland flow may be reduced by 10%–40% of the flow which would otherwise have occurred in and around a building.

When the water storage and storm water control apparatus is installed in a building it results in fewer storm water drains, more efficient use of water hence lower domestic and/or industrial water costs, reduction in the need for water restrictions and depending upon the site, reduced costs in treating and/or pumping water.

Once the apparatus is installed in a new building for instance, there is less capital cost on the dwelling, reduced damage to ecosystems within storm water catchments, smaller storm water drains for subdivisions, smaller lines in road drainage systems and a reduction in pressure on existing storm water lines.

According to a preferred embodiment the storage reservoir 50 requires good aesthetics. This is particularly important in domestic dwellings. In order to achieve this a cladding material 59 is applied around the outer exposed surfaces 60 and 61. The cladding material such as coloured corrugated iron may be affixed to surfaces 60 and 61 of a supporting frame by means of pop rivets 62. In these installations the cladding 59 will be continued around the back surface 63 of supporting frame of reservoir 50. A suitable material for use as cladding 59 may be ribbed aluminum or steel where fixed to a supporting frame 57. Where storage reservoir 50 is a self supporting shell, then construction could be in concrete, lightweight concrete, aerated concrete or timber (incorporating an impervious liner).

Figure 8:
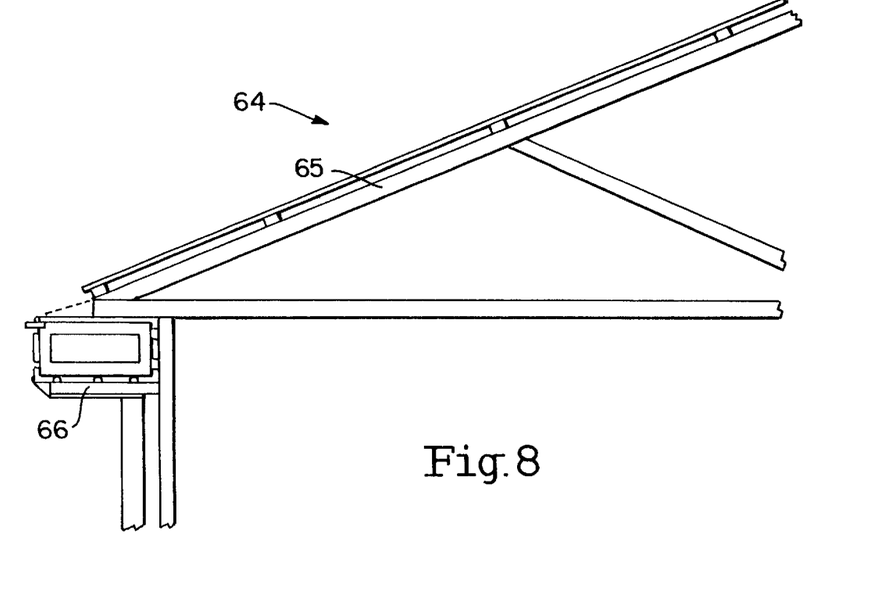
FIG. 8: shows an elevational view of a dwelling incorporating the apparatus of FIG. 7.

FIG. 8 shows a cross sectional view of the assembly of FIG. 7 fitted to a dwelling 64. As can be seen from the figure the tank 50 sits neatly under eaves formed by truss frame 65 supporting joists 66 are optional.

Figure 9:
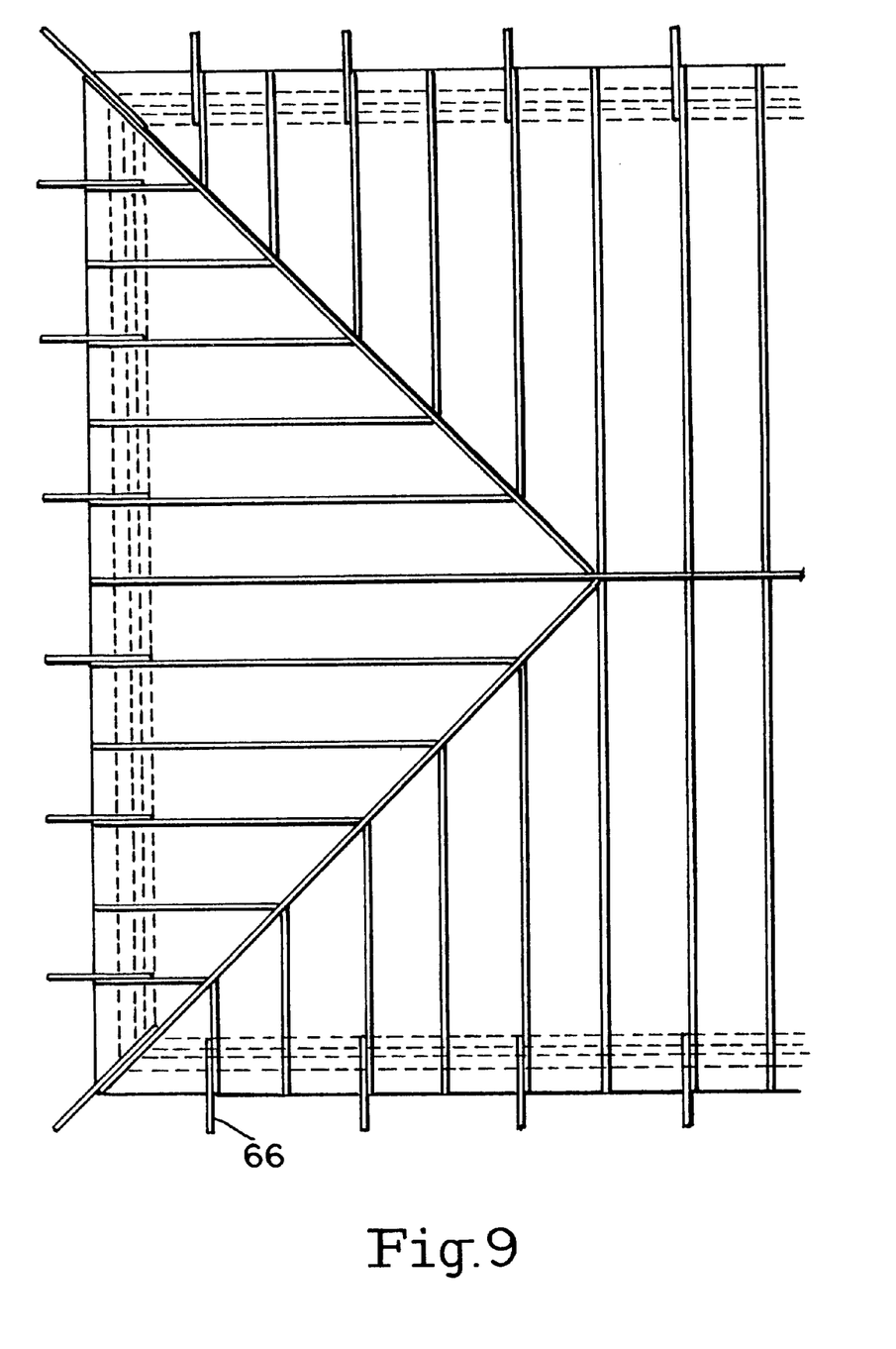
FIG. 9: shows a plan view of a hip end of the roof structure of a dwelling showing gutter joists used to support the water storage and storm water control apparatus.

FIG. 9 shows a plan view of a roof frame which includes gutter joists 66 which are adapted as required to support the water storage and storm water control assembly.

Figure 10:
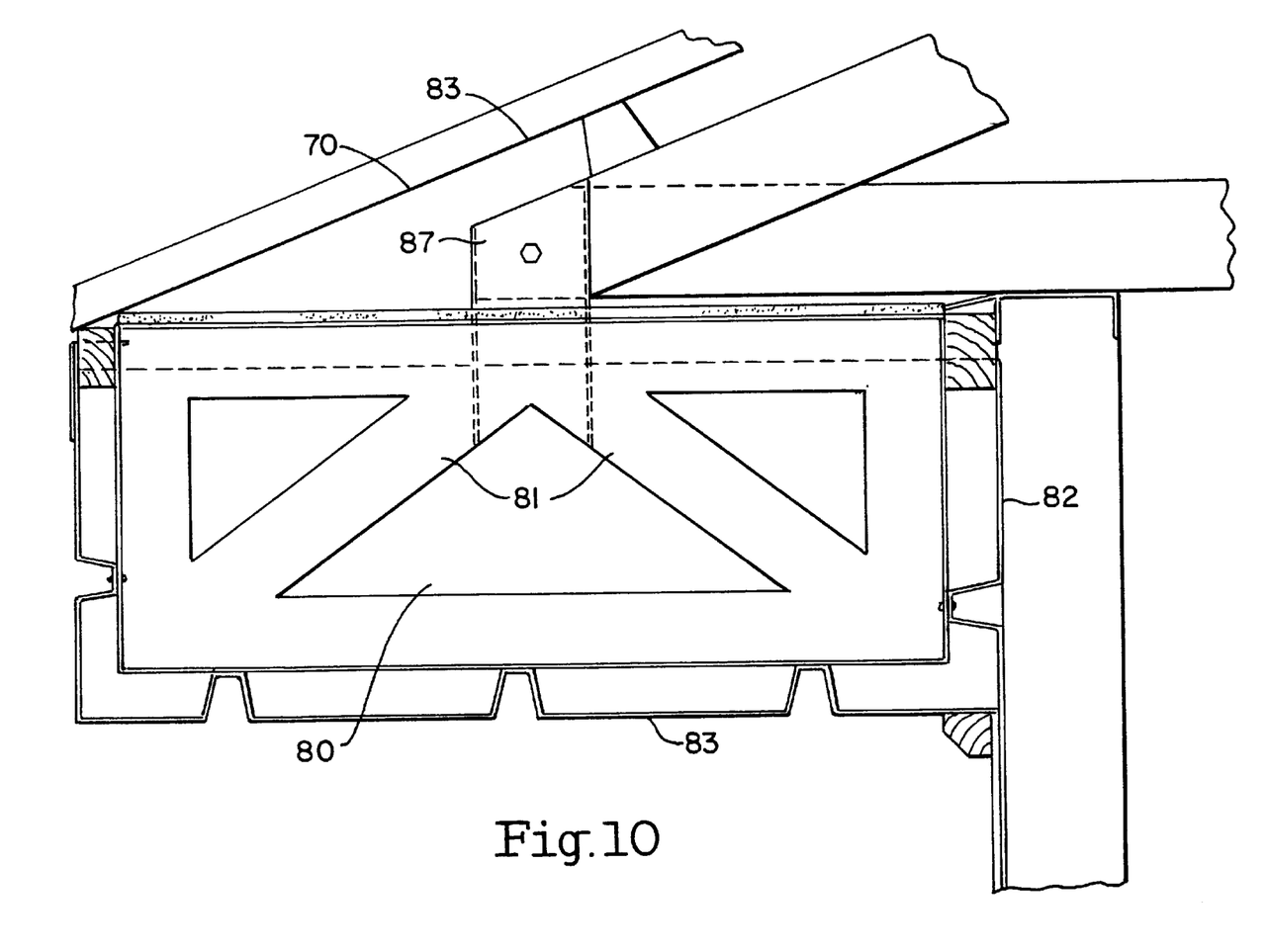
FIG. 10: shows a cross sectional view of the apparatus of FIG. 7 according to an alternative embodiment fitted to a typical dwelling showing bracing members.

FIG. 10 shows an alternative arrangement for the water storage reservoir 80 supported by straps hanging from roof truss 87. This example applies to single or double wall construction. Truss 87 can be structurally modified to allow storage reservoir 80 to withstand various natural phenomena such as high wind and snowload. Reinforcing for storage reservoir 80 comprising bracing members 81. A metal strap 82 secures cladding 83 in this example. Roofing material can be either sheet material or tile material and perforations 70 are made in the material to allow storm water into storage reservoir 80. Perforations should be covered with insect mesh 83 to prevent entry of leaves or insects to storage reservoir 50, but to allow entry of storm water.

The storm water storage apparatus is particularly applicable to domestic dwellings. The installer hangs reservoir 80 from truss 87 so that the weight of the water is largely taken by the truss members. The reservoir is preferably fabricated from sheet steel into a generally rectangular configuration with the proportions dependant upon the volume of storage required. Straps surround the reservoir and engage the roof trusses thereby providing intermediate support along the length of the wall of the building. Wall brackets may also be provided as supplementary support. As light gauge metal is used it is desirable that the inside of the reservoir be adapted with cross bracing 81 to reinforce the walls of the reservoir. The reservoir may be profiled so that its external faces function as fascia and eaves. Alternatively, the outer face may be profiled so that it takes on the appearance of a conventional guttering and facia board terminating in the bottom of the reservoir to function as an eave. As shown in FIG. 10 the reservoir may be lined with cladding to provide an aesthetic finish.

Figure 11:
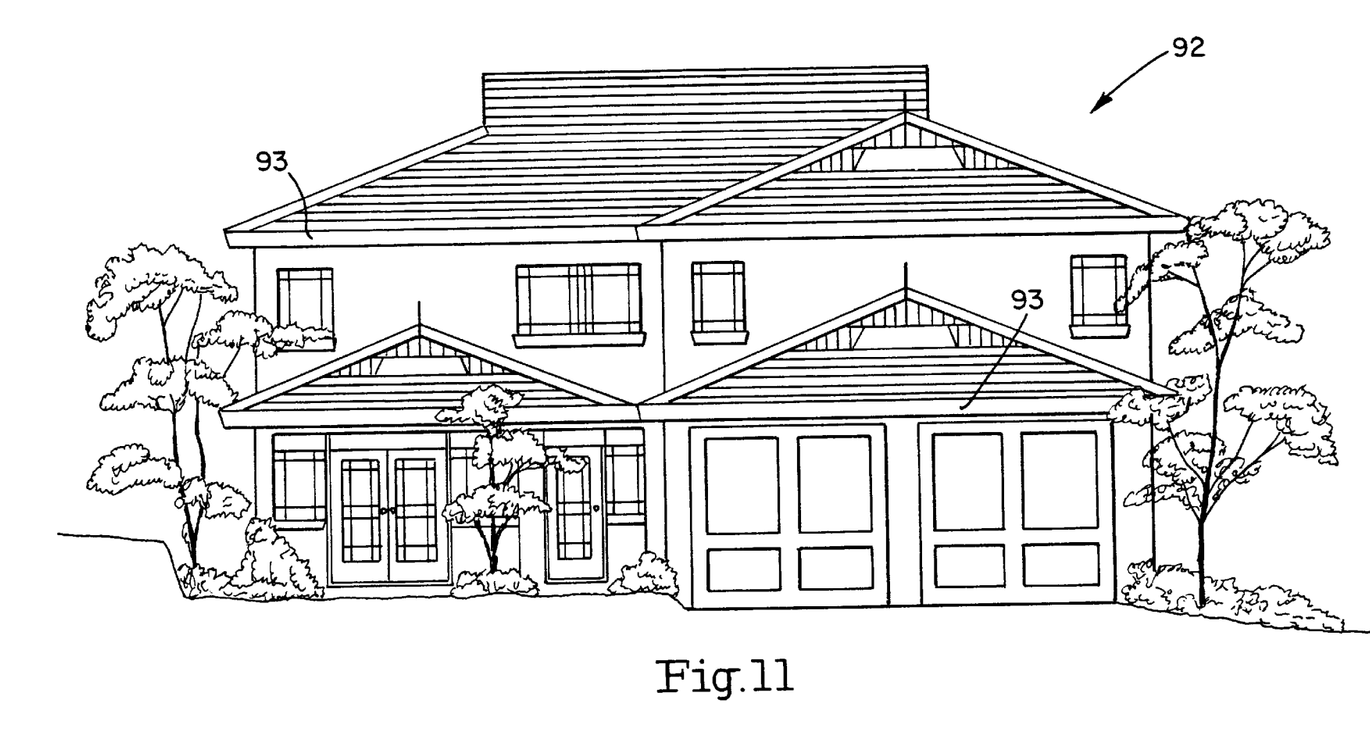
FIG. 11: shows an elevational view of a dwelling having affixed thereto a water storage and storm water control assembly according to a preferred embodiment of the invention.

FIG. 11 shows an elevational view of a dwelling 92 having a water storage and storm water control apparatus 93 connected thereto.

Figure 12:
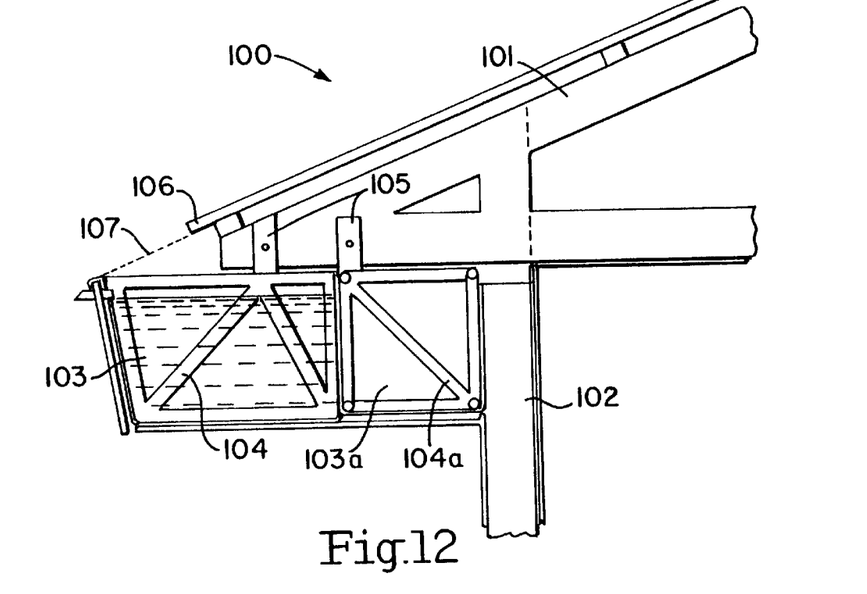
FIG. 12: shows an alternative embodiment of the water storage and storm water detention apparatus.

Referring to FIG. 12 there is shown an alternative embodiment of the water storage and storm water detention apparatus. Referring to the figure there is shown part of a dwelling 100 showing part of a truss 101 and part of the supporting wall 102. According to this embodiment the apparatus includes reservoir 103 and supplementary reservoir 103a. Both of these reservoirs are reinforced with bracing members 104 and 104a respectively providing structural rigidity to the reservoirs. Each reservoir is affixed to truss 101 by means of roof straps 105. This type of fixation is repeated for each roof truss along the wall of the dwelling 100. Storm water run-off passing along roof cladding 106 through aperture 107 and thence into reservoir 103. Reservoir 103 when full may first overflow and fill reservoir 103a to provide added storage capability.

Figure 13:
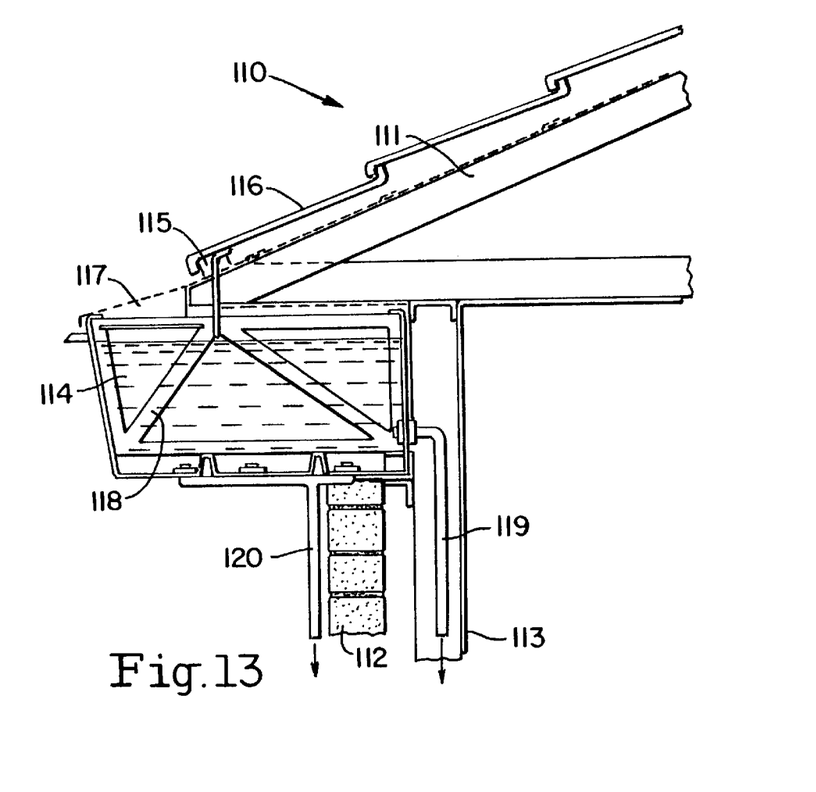
FIG. 13: shows an alternative arrangement of a water storage and storm water detention apparatus.

FIG. 13 shows an alternative arrangement of the water storage and storm water detention apparatus. Referring to the figure there is shown part of a dwelling 110 including part of roof truss 111 and part external wall 112 and internal wall 113. The apparatus includes reservoir 114 which is affixed in this instance to roof batten 115. When recipitation occurs it passes along roof 116 thence through opening 117 and into reservoir 114 which is strengthened by braces 118. Water from reservoir 114 gravitates to an appliance inside the building via feed line 119. Alternatively water may gravitate externally of the building via feed line 120. In the latter case the feed line may terminate in an external tap.

Figure 14:
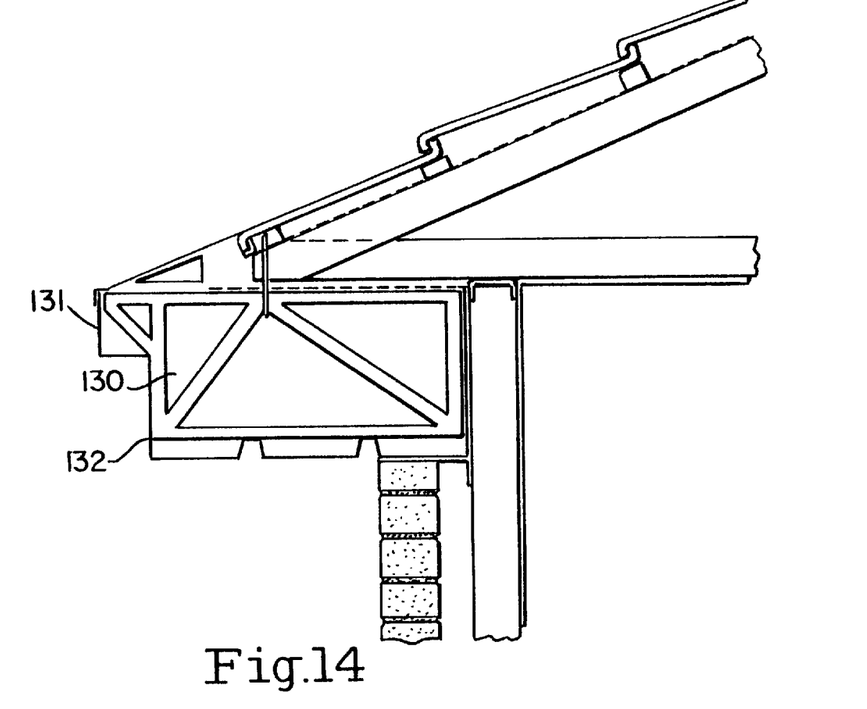
FIG. 14: shows an alternative reservoir profile.

FIG. 14 shows a further form of the reservoir profile. In the configuration shown in FIG. 14 reservoir 130 is adapted with an outer face profile which is formed to simulate the appearance of guttering 131 and fascia 132. Reservoir 130 can be installed in dwellings where the consumer requires a more conventional appearance for the roof and eaves line of a dwelling.

Figure 15:
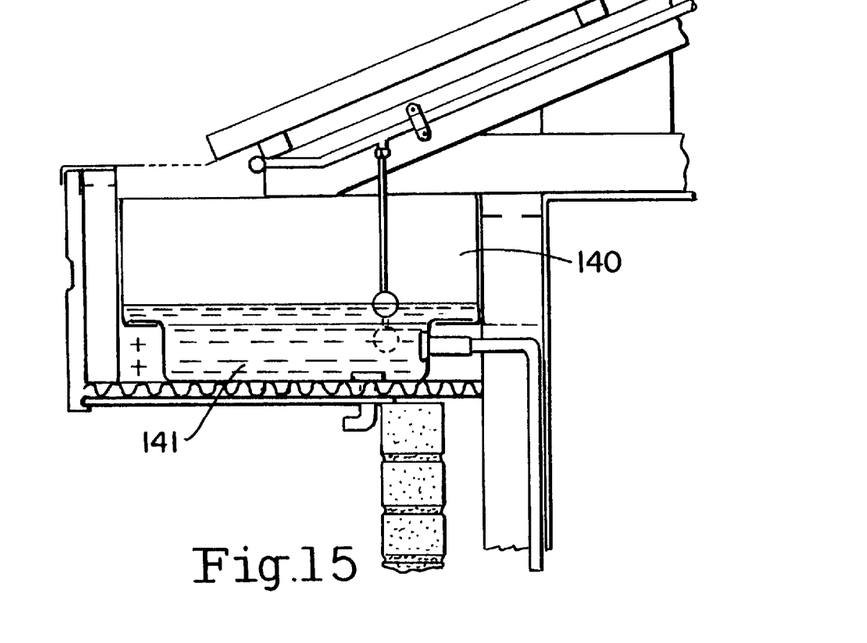
FIG. 15: shows a further embodiment of the reservoir of the storm water collection and detention apparatus.

FIG. 15 shows a further embodiment of the apparatus according to the invention.

FIG. 15 shows reservoir 140 including profiled in its bottom portion a toping up well 141. This adds additional volume to the reservoir.

The performance of the apparatus described in its various embodiments has been analysed to investigate overflow characteristics of storm water for selected buildings in Japan. The objective of the analysis was to estimate the flow rate of the overflow from the apparatus for the selected building. For the analysis, it was assumed that over flow occurring on any day occurred for 20 hours of that day and that an average building to which the apparatus is fitted will have 16 overflow spigots to facilitate storm water overflow. The analysis was conducted in Osaka and Tokyo based on rainfall records for 1993.

Characteristics of each dwelling selected are set out in the table below:

TABLE 1

Dwelling Characteristics

|  | 120 m² roof | 60 m² roof |
|---|---|---|
| Total Tank Volume (L) | 9375 | 6750 |
| Volume for Emergency Storage (L) | 3000 | 2000 |
| Effective Tank Capacity (L) | 6375 | 4750 |
| Number of Occupants | 3.2 | 3.2 |
| Water Usage (L/person/day) | 300 | 300 |

The non-potable water usage as a percentage of total water usage used for the analysis is given in Table 2. Non-potable water usage makes up about 77% of total water usage.

TABLE 2

Non-potable Water Usage as Percentage of Total Water Usage

| WATER USAGE | % OF TOTAL WATER USAGE |
|---|---|
| WC | 23.0 |
| Shower - cold water | 11.5 |
| External use | 25.0 |
| Laundry | 16.0 |
| Bath - cold water | 1.5 |
| Sub-Total | 77.0 |

For the purposes of the analysis a rainfall event has been defined as one or more consecutive days on which rainfall occurs. Additionally, any overflow must occur on either one or more consecutive days of the rainfall event. In the case of consecutive days of overflows not occurring on consecutive days, this period is divided into separate events by consideration of overflows on consecutive days. An overflow even has been defined as any rainfall event during which overflow occurs on one or more consecutive days.

A summary of the performances on each system on an annual basis for 1993 is provided in Table 3 below:

TABLE 3

Performance Summary

|  | Osaka | | Tokyo | |
|---|---|---|---|---|
| Total Roof area (m²) | 60 | 120 | 60 | 120 |
| Effective Tank Volume (m²) | 4750 | 6375 | 4750 | 6375 |
| Total roof run-off (kL) | 98 | 195 | 112 | 225 |
| No. rainfall events | 68 | 68 | 70 | 70 |
| No. rainfall days | 130 | 130 | 135 | 135 |
| No. overflow events | 3 | 8 | 3 | 13 |
| No. overflow days | 6 | 14 | 5 | 20 |
| Run-off Volume Captured (kL) | 97 | 195 | 113 | 225 |
| % Run-off Captured | 90 | 77 | 88 | 70 |
| Overflow/rainfall volume (%) | | | | |
| Mean | 25.3 | 41.9 | 31.5 | 41.2 |
| Median | 2.9 | 35.2 | 21.9 | 41.8 |
| Mean spigot overflow rate (L/min) | 0.155 | 0.174 | 1.231 | 2.216 |
| Median spigot overflow rate (L/min) | 0.152 | 0.205 | 0.058 | 0.094 |
| Rainwater usage/total non-potable water usage (%) | 34 | 58 | 37 | 59 |
| Top-up water required (kL) | 179 | 115 | 168 | 109 |
| Proportion of total water usage to be purchased (%) | 72 | 44 | 68 | 36 |

It will be recognised by persons skilled in the art that numerous variations and modification can be made to the present invention as broadly described herein without departing from the overall spirit and scope of the invention.

What is claimed is:

1. A method for collecting and storing storm water run-off from a storm water catchment provided by a roof of a building using a water storage and storm water collection assembly for forming part of the building structure of the type comprising walls and a roof including roof cladding terminating at a roof edge, said assembly comprising:

at least one storage reservoir for receiving and storing run-off from said roof, wherein said at least one storage reservoir is adapted to be integral with the building structure at an extremity of said roof and generally follows the roof edge, said at least one reservoir each comprising a generally channel shaped profile having at least a base and side walls, said side walls defining an upper opening which receives said run-off, at least one outlet from the reservoir in communication with a mechanism allowing for the use of said water being collected, said mechanism being selected from the group consisting of a water consuming apparatus or a tap via a supply line; wherein each said reservoir is elongated and extends a preselected distance along the roof edge and stores storm water run-off until demanded by said tap or water consuming appliance, the method comprising the steps of:

(a) fixing at least one said reservoir to the building at the edge of the roof of the building so that the at least one said reservoir forms the fascia and eaves of the building wherein run-off is collected in the at least one said reservoir, (b) providing an outlet line in the reservoir which communicates with a device which consumes water;

(c) providing an overflow in said at least one reservoir;

(d) providing an inlet line which delivers main water supply to supplement the storm water supply in at least one said reservoir when the water falls below a predetermined level; and (e) providing a float valve assembly on the inlet line to regulate flow of the main water supply to each said reservoir.

2. A method for the collection and storage of storm water discharge from a building for delivery to a valve, tap or water consuming appliance comprising the steps of:

(a) installing at least one water storage reservoir at a preselected location on the building so that each said reservoir is integral with the building and is adapted to be located about the periphery of a roof edge formed by an edge of roof cladding and generally extending there along;

(b) providing an opening to each said at least one water storage reservoir which is in communication with a storm water roof catchment on the building to convey storm water to said at least one reservoir;

(c) providing an outlet in communication with a second source of water from a remote location which discharges into the at least one said reservoir to supplement storm water stored in at least one said reservoir;

(d) providing on at least one reservoir an outlet which communicates with a mechanism allowing for the use of said water being collected, said mechanism being selected from the group consisting of a water consuming apparatus or a tap via a supply line; and which discharges water;

(e) providing a float valve assembly in the reservoir which allows the second source of water to supplement the water stored in the reservoir from said catchment, and (f) providing an overflow in the reservoir for discharge of water when the water in the reservoir reaches a predetermined level.

3. A water storage and storm water collection and detention assembly, adapted for attachment to a building structure of a type comprising walls and a roof structure, comprising:

at least one storage reservoir for receiving and storing run off from said rook structure, said at least one storage reservoir being integrally attached to the building structure at an extremity of said roof and generally following a roof edge; each said storage reservoir comprising a profile having at least a base and side walls and defining at least part of an eave of the building and a periphery of the building wherein an outer face of each said reservoir forms a building fascia, said side walls extending upward from the base, and defining an upper opening near said roof edge, wherein, when said at least one storage reservoir is in position adjacent said roof extremity, such that said at least one storage reservoir is generally elongated and extends a predetermined distance along the building at the roof edge and is capable of receiving said run-off directly from said roof edge anywhere along the length of each said reservoir;

at least one outlet from one or more said reservoirs, said at least one said outlet located at the base of each said reservoir;

a supply line with which each said outlet communicates is located with a surface of at least one of said walls of the building;

an overflow outlet located in an upper region of one of the walls of the reservoirs; and a float valve assembly, said supply line discharging supply water into each said resvoir by means of said float valve assembly connected to said supply line, wherein the reservoir is in communication with a mechanism allowing for the use of said water being collected, said mechanism being selected from the group consisting of a water consuming apparatus or a tap via said supply line, and wherein each said reservoir stores storm water run off until demanded by said tap or water consuming apparatus.

4. An assembly according to claim 3, wherein each said reservoir is connected via a connecting pipe or opening to an adjacent reservoir enabling free passage of water between said reservoirs.

5. An assembly according to claim 4, wherein each said reservoir is proportioned according to a catchment area and rainfall in a given geographical area.

6. An assembly according to claim 5, wherein the catchment area is provided by the roof surface of the building.

7. An assembly according to claim 6, wherein the float valve assembly allows a main supply water to enter at least one said reservoir when the water level in the at least one said reservoir falls below a predetermined minimum level.

8. An assembly according to claim 7, wherein a total cross sectional area of the overflow openings is such that overflow capability is sufficient to accommodate a storm for a selected geographical area.

9. An assembly according to claim 8, wherein the area of each said overflow openings collectively for each square meter of catchment area falls within the range of 15 mm sq. to 200 mm sq.

10. An assembly according to claim 6, wherein the at least one said reservoir extends about the periphery of the building at the roof edge.

11. An assembly according to claim 10, wherein the reservoir further comprises an area for collection of silt and debris near an opening of said reservoir which receives runoff from said roof.

12. An assembly according to claim 11, wherein the area for collection of silt and debris comprises a recess or platform within each said reservoir, said recess or platform capable of retaining solid or particulate matter.

13. An assembly according to claim 3, wherein said roof edge extends and terminates over an opening of said reservoir.

* * * * *